Patented July 15, 1924.

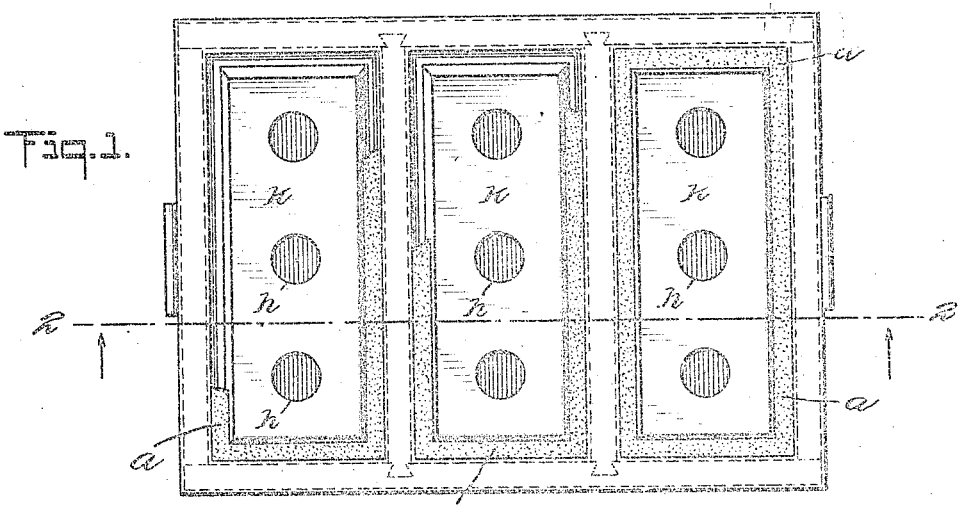
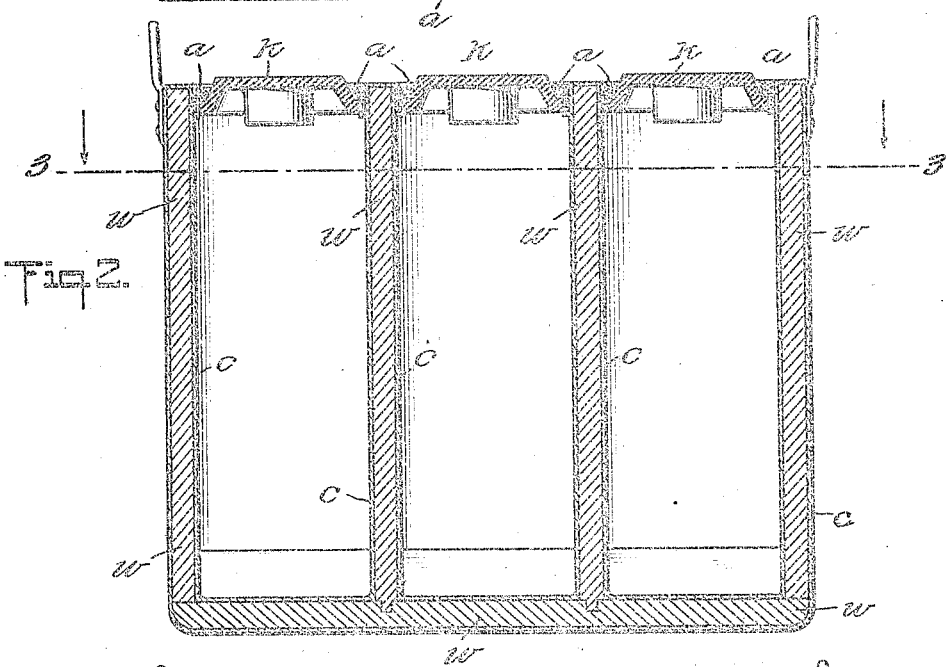
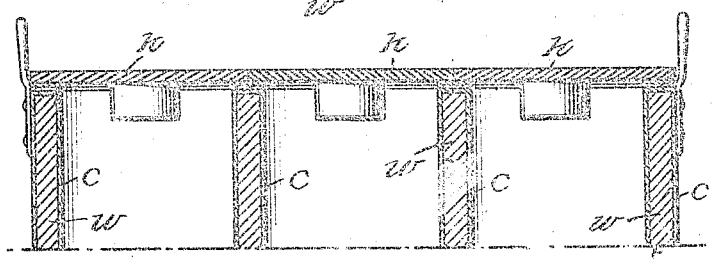

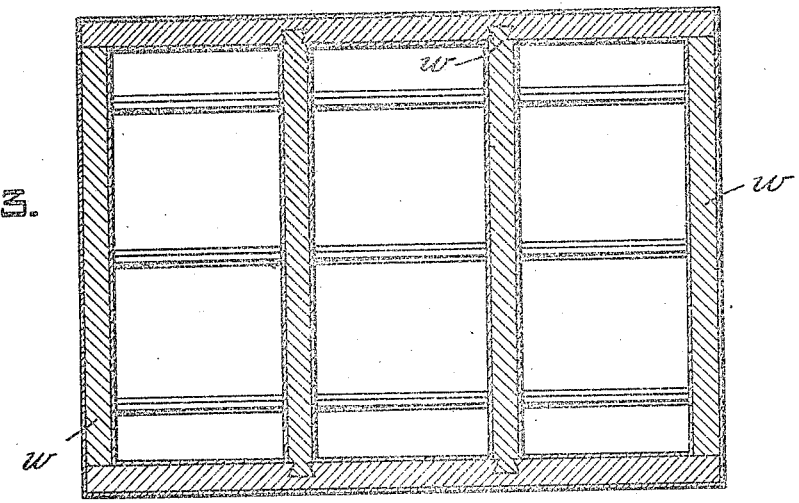
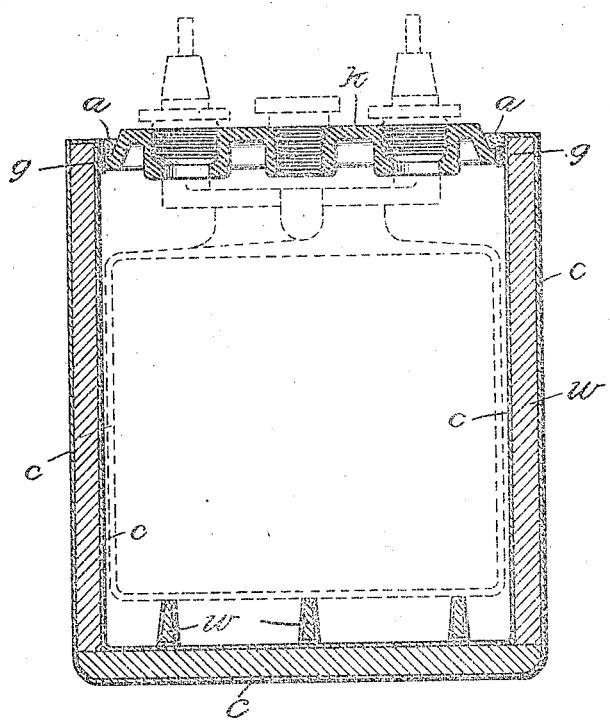
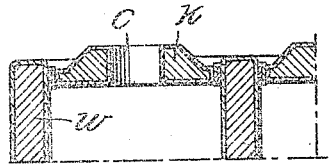

1,501,351

UNITED STATES PATENT OFFICE.

LAMAR LYNDON, OF NEW YORK, N. Y.

CONTAINING CELL FOR ELECTRIC BATTERIES.

Application filed November 1, 1919. Serial No. 335,060.

*To all whom it may concern:*

Be it known that I, LAMAR LYNDON, a citizen of the United States, residing in the city of New York, county and State of New York, have invented certain new and useful Improvements in Containing Cells for Electric Batteries, of which the following is a specification.

This invention relates to containing jars or cells for any form of electric battery but finds its principal application to elements made of lead oxide immersed in dilute sulphuric acid, and has been developed more especially with a view to obviating certain difficulties which now exist in the smaller sizes of storage battery cells, which are customarily made of hard rubber.

A specific application of this invention is that of the production of storage batteries for starting and lighting purposes, on motor cars, but it is equally applicable to other types of batteries.

The main objects of this invention are; to produce a battery container which will be durable, which is not subject to cracking and thereby allowing the electrolyte to drain out, and which shall be low in first cost, as compared with that of present types of battery containers.

Further objects of this invention will hereinafter appear.

Briefly, this invention comprises the construction of battery containers of wood having the desired dimensions, and the subsequent coating thereof with a material which is liquid or plastic, and which substance subsequently becomes hard, although it may retain a certain amount of resiliency. The coating is impervious to acid and provides the necessary water-tight and acid-resisting qualities, while the wooden box provides the strength required for the purpose intended.

In the specific application of this invention to the production of batteries having a plurality of cells, the preferable construction is to make the box of sufficient dimensions to contain all the elements, and place wooden partitions in the box in such number as to form the desired number of cells. The entire structure, thus formed, is then coated with the impervious and acid-resisting substance, such as collodion or liquid rubber, by spraying, dipping, or in any practical manner.

The wooden box or container may be built up of boards or may be fashioned from a single piece of timber, or may be of wood pulp admixed with some binding material.

The drawings, herewith, illustrate one method of application of this invention.

These drawings show the arrangement adapted for the usual standard lighting and starting battery for gasoline motor cars, but they illustrate equally well the application to single individual cells or to a greater number of cells connected either in series or in parallel. The present practice for gasoline motor car service is to make batteries of three cells in series, giving approximately six volts.

Fig. 1 of the drawings shows a plan view of a box in which two partitions are placed, thus forming three compartments or cells.

Fig. 2 is a vertical section thereof on the line 2—2, while Fig. 3 is a horizontal section along the line 3—3.

Fig. 4 is a vertical section showing plates, terminals, and vent plug in position, while Figures 5, 6, and 7 indicate different methods of applying covers to the cells.

As indicated in the various figures, the separate pieces forming the box are securely joined together, so that shrinking or warping will not cause any relative change in position of the sides, end, bottom, and partitions. The parts may be fastened together in any approved means, such as dovetailing, glue, screws, or any combination of these methods. The wood is preferably thoroughly dried so that it will have no tendency to warp, crack or become otherwise distorted. These conditions apply to containers made up of separate boards. If made of wood-pulp, the entire structure will be integral without joints and the question of seasoning will be that adapted to the wood-pulp used.

After the box or container is finished, it may be dipped in a suitable liquid or plastic material, such as, for instance, pyroxylin. The number of such dippings will depend on the character of the wood and the service the battery is to render, but more than one dipping will usually be required. The covering may, of course, be applied with a brush or by spraying or in any suitable manner.

Some provision must usually be made for the application of a cover to the battery containers, and Figures 2, 4, 5, 6, and 7, indicate different types of covers and methods of sealing them in place.

In the figures, "W" represents the wooden box, "C" the thin protecting coating, "G" gaskets, and "K" covers.

Figures 2 and 4 show identical forms of cover, Figure 2 being a transverse section, while Figure 4 is a longitudinal section. As shown in these figures, the covers are set inside the compartments, and in the space "a" formed by the beveled portions of the covers, sealing compound of any approved kind may be poured while in liquid or plastic condition, and after hardening, the covers will be fastened in position.

The use of sealing compound to fill up the space formed by the bevel portion of the cover is not necessary. If the cover and the walls of the jar be coated with material which may be cemented together, a cemented joint can be made between the edges of the cover and the walls of the jar. For instance, if both coatings are of a pyroxylin plastic, they may be sealed together with acetone, while if of rubber, collodion, or other substance, any suitable solvent or cement will seal the adjacent portions and thereby fix the cover mechanically and hermetically in place.

Fig. 5 shows another method in which the cover is placed on top of the compartment and is sealed thereto by any kind of compound or cement, which will unite cover to compartment.

In Figures 4 and 5, the cross section of the covers shown is comparatively thin, and the methods which have been described are more specifically applicable to sealing in covers made of hard rubber or celluloid. Satisfactory covers can be made from wood, coated with any suitable substance, which is impervious and will resist sulphuric acid. Figures 6 and 7 show the application of wood covers, so treated, to the compartments. In Figure 6, the cover fits on top of the compartment and is sealed thereto with any desirable compound, while in Fig. 7, the wood cover is shown placed inside the compartment and is sealed thereto by any cement or solvent which will unite the adjacent surfaces.

The thickness of the coating of acid-resisting material, is so small, that wherever a cover is sealed to compartment, subsequent removal thereof will tear particles of the protective coating from either the compartment or from the cover, or from both. I, therefore, prefer to provide two gaskets, one of which is applied to the compartment, and one to the cover, which gaskets are preferably made of the same material as the protective coating, these gaskets being cemented in their respective places. When the cover is cemented to the compartment, the union takes place between the adjacent surfaces of the two gaskets, so that the cover may afterwards be removed, without rupturing the protective coating.

These gaskets need not be separate pieces applied to the jar and to the cover, but the protective coating may be thickened on both cover and compartment at points where the two make contact. In Fig. 4, the gaskets or thickening of the protective coating should be on the inside surface of the compartment, near the top, while the other gasket will be around the edge of the cover, where it contacts with the walls of the compartment, and the first named gasket.

In the case where the cover rests on top of the compartment, one gasket will lie around the top edge of the compartment, while the cover gasket will be placed on the under side of the cover, as indicated.

It will be observed that by the use of this invention, individual battery containing jars of expensive material, like rubber and preparations known under the trade name of celluloid, may be dispensed with, and at a considerable saving in cost, and also, a battery having a plurality of cells, may be built up in one single structure, thus economizing in cost, space, and convenience.

There are, obviously, several impermeable, acid-resisting materials, which may be applied in a liquid form, and which afterwards harden and become permanently fixed in place. Without enumerating equivalents and variations, I claim as my invention:

1. A battery container made of wood coated with an impervious acid-resisting substance, a cover adapted to co-operate with said container, and a gasket interposed between said cover and said container formed by a thickening of said impervious, acid-resisting substance.

2. A battery container comprising a wooden box having partitions therein to form a plurality of individual cells, said container being covered with an impervious acid-resisting substance, a cover for each cell, and a gasket between each cell and cover formed by a thickening of said impervious, acid-resisting substance.

3. A battery container made of non acid-resisting material protected with a coating of impervious acid-resisting material, a cover for said container, a gasket applied to said cover, and a second gasket applied to said container and co-operating with said first gasket, said gaskets being formed by a thickening of said impervious, acid-resisting material.

4. A battery container comprising a box made of non acid-resisting material and having partitions therein to form individual cells, a cover for each one of said cells, a coating of impervious acid-resisting material for said container, and gaskets between said individual cells and corresponding covers formed by thickening of said coating.

5. A battery container comprising a wooden box coated with a pyroxlin plastic and having partitions therein to form individual cells, and means for attaching a cover to each cell, which means comprise a gasket applied to the cover and a second gasket applied to the corresponding cell and co-operating with said first gasket, said gaskets being formed by a thickening of said pyroxylin plastic.

6. A battery container comprising a box made of non acid-resisting material and having partitions therein to form individual cells, a cover for each cell also made of non-acid-resisting material, a protective coating of impervious acid-resisting material for each cell and cover, and gaskets between each cell and corresponding cover formed by thickening of said acid-resisting material.

7. A battery container made of wood coated with a pyroxylin plastic, a cover adapted to co-operate with said container, and a gasket between said cover and said container formed by thickening of said pyroxylin plastic.

8. A battery container comprising a wooden box having partitions therein to form a plurality of individual cells, said container being covered with a pyroxylin plastic, a cover for each cell, and a gasket between each cell and cover formed by thickening of said pyroxylin plastic.

In testimony hereof, I hereto sign my name in the presence of two subscribing witnesses.

LAMAR LYNDON.

Witnesses:
ALEXANDER CHESSIN,
DANIEL T. DOBYNS.